US008351911B1

(12) United States Patent
Martin et al.

(10) Patent No.: US 8,351,911 B1
(45) Date of Patent: Jan. 8, 2013

(54) PROVIDING DIGITAL CONTENT USABILITY FOR A MOBILE DEVICE USER

(75) Inventors: Geoffrey Martin, Overland Park, KS (US); Jonathan Kindred, Olathe, KS (US); Jennifer Kindred, legal representative, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 707 days.

(21) Appl. No.: 12/342,950

(22) Filed: Dec. 23, 2008

(51) Int. Cl.
*H04M 3/00* (2006.01)
*G06F 15/16* (2006.01)

(52) U.S. Cl. .................... 455/414.2; 455/419; 709/232; 709/219

(58) Field of Classification Search .................. 455/419, 455/420, 426, 466; 434/317, 307; 709/232, 709/219; 717/173
See application file for complete search history.

(56) References Cited

U.S. PATENT DOCUMENTS

2003/0027563 A1* 2/2003 Herle et al. .................. 455/419
2008/0076397 A1* 3/2008 Shin et al. .................. 455/414.1
2009/0150553 A1* 6/2009 Collart et al. ................ 709/229

FOREIGN PATENT DOCUMENTS

JP 2002-077071 * 9/2000

* cited by examiner

*Primary Examiner* — George Eng
*Assistant Examiner* — Nizar Sivji

(57) ABSTRACT

A method, system, and medium are provided for ensuring usability of digital content on a mobile device. In exemplary aspects, digital content on a mobile device is rendered unusable, such as where a download is interrupted. The usability of the digital content is automatically restored to the mobile device without user intervention. In situations in which the mobile device is unavailable, digital content might be restored to an alternative mobile device and an advisory notification might be communicated.

9 Claims, 4 Drawing Sheets

PROVIDING DIGITAL CONTENT USABILITY FOR A MOBILE DEVICE USER

A mobile device is often subjected to various movements, such as acceleration, deceleration, and impact with other objects. As a result of such movements, digital content stored on the mobile device might be rendered unusable. Moreover, if such movements occur in the middle of a download of digital content to the mobile device, the downloading digital content might become usable.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In a first aspect, a set of computer-useable instructions provides a method of restoring a usability of digital content to a mobile device. The method includes detecting a motion event of the mobile device. The motion event relates to a motion experienced by the mobile device and exceeds a severity threshold. A diagnosis request is communicated to a server, which results in a determination as to whether any digital content associated with the mobile device is unusable. When the server determines that digital content is unusable, usability of the digital content is automatically restored without user intervention.

In another aspect, a set of computer-useable instructions provides a method of restoring digital content associated with a mobile device. The method includes initiating a download of requested digital content to the mobile device and receiving an indication of an interruption of the download. The method also includes communicating a status request to the mobile device to prompt a status response from the mobile device and waiting a period of time to receive the status response from the mobile device. If the status response is received from the mobile device within the period of time, the method includes deeming that at least a portion of any digital content associated with said mobile device is not useable. Alternatively, if the status response is not received from the mobile device within the period of time, the method includes communicating an advisory notification to a target resource. The advisory notification indicates that the mobile device might need to be serviced.

In a further aspect, additional steps might be performed prior to sending an advisory notification. For example, a condition might state that a predetermined number of status requests should be sent before sending an advisory notification. As such, prior to sending an advisory notification, a determination might be made as to whether or not a predetermined number of status requests have been communicated. If the predetermined number has not been communicated, one embodiment includes communicating another status request to the mobile device and giving the mobile device another opportunity to communicate a status response. If the predetermined number has been communicated, an advisory notification is communicated to a target resource.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

Embodiments of the present invention provide systems and methods related to ensuring usability of digital content on a mobile device. In exemplary aspects, digital content on a mobile device is rendered unusable, such as where a download is interrupted. In further aspects, the usability of the digital content is automatically restored to the mobile device without user intervention. In other embodiments in which the mobile device is unavailable an advisory notification is communicated. Some of the wording and form of description is done so herein to meet applicable statutory requirements. Although the terms "step" and/or "block" or "module" etc., might be used herein to connote different components of methods or systems employed, the terms should not be interpreted as implying any particular order among or between various steps herein disclosed unless and except when the order of individual steps is explicitly described.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1A:
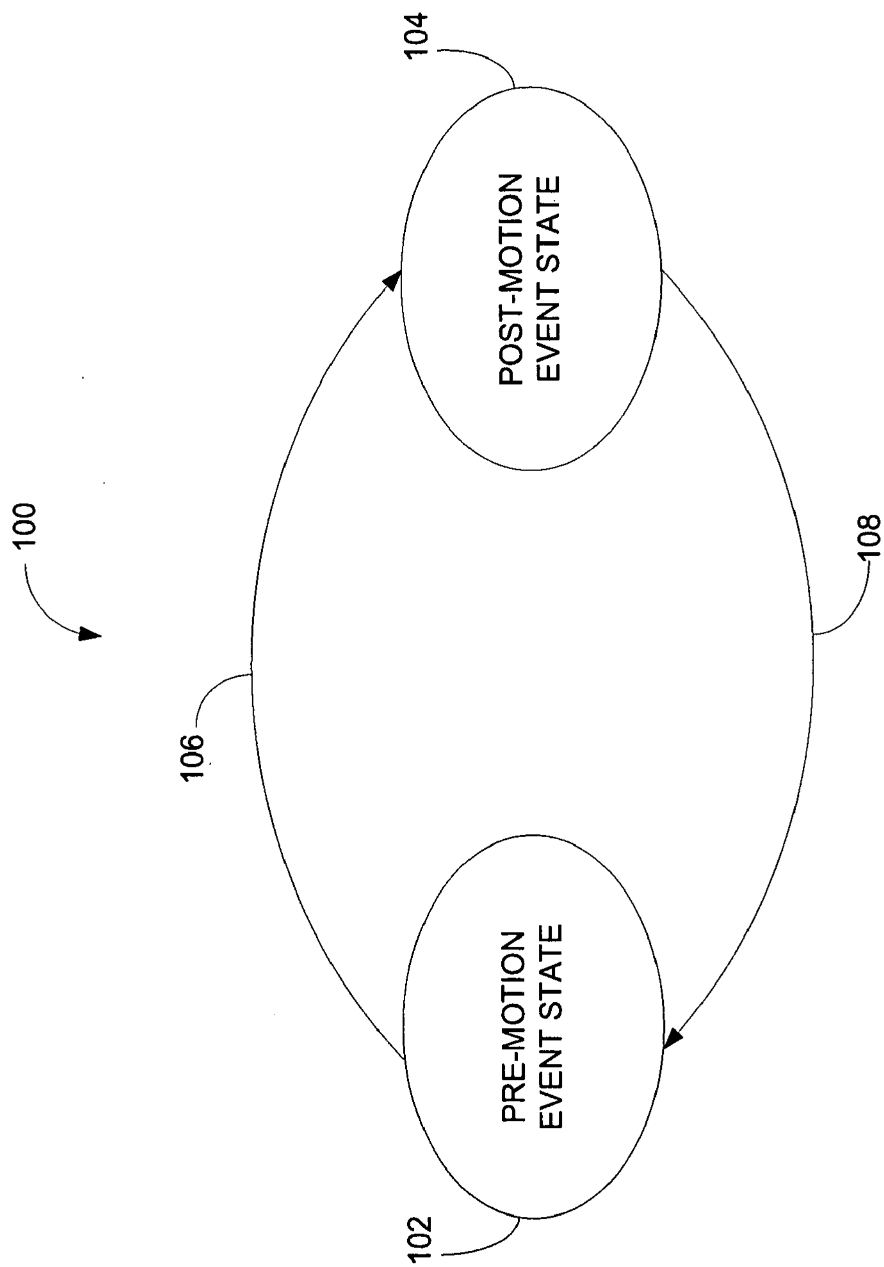
FIG. 1A depicts a state diagram illustrating aspect of the present invention.

Referring to FIG. 1A, a transition diagram, represented generally by numeral 100, is shown. The transition diagram illustrates possible transition states of a mobile device in accordance with an aspect of our technology. For example, a pre-motion event state 102 and a post-motion event state 104 are shown connected by arrows 106 and 108. Arrows 106 and 108 represent movement of a mobile device from one state to another. A pre-motion event state 102 describes a state of a mobile device prior to a specific motion event. Motion events can include a variety of episodes, such as an acceleration of a mobile device, a deceleration of a mobile device, and an impact of a mobile device with another object or surface. The pre-motion event state 102 and post-motion event state 104 are helpful to illustrate an aspect of the technology in which the substance of usable digital content on a mobile device is altered as a result of a motion event. For example, transition 106 represents a mobile device moving from a pre-motion event state 102 to a post-motion event state 106, such as might happen when a mobile device is dropped on a ground surface. In the pre-motion event state 102 the mobile device might have stored thereon a set of usable digital content. However, once the mobile device transitions 106 to a post-motion event state 104 (as a result of being dropped on the ground), the mobile device might have stored thereon a diminished set of usable digital content, as pre-motion event digital content might have been rendered unusable due to the impact with the ground. Transition 108 illustrates transition of a mobile device from post-motion event state 104 to pre-motion event state 102. For example, if usability of all digital content rendered unusable during transition 106 is restored to the mobile device, the mobile device transitions 108 from post-motion event state 104 to pre-motion event state 102.

Figure 1B:
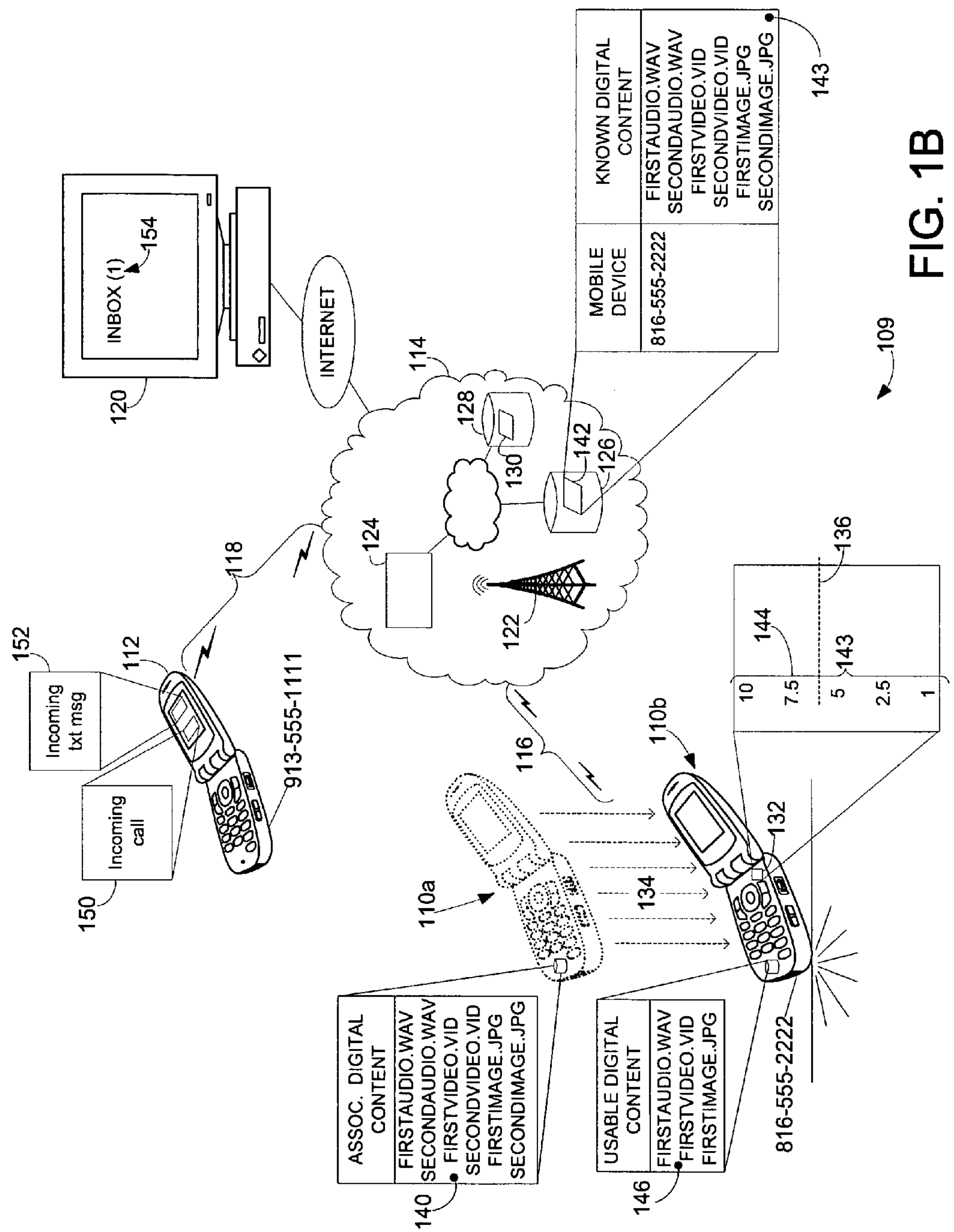
FIG. 1B depicts an illustrative operating environment suitable for practicing an embodiment of the present invention.

Turning now to FIG. 1B, an illustrative operating environment suitable for practicing an embodiment of the technology is provided and identified generally by numeral 109. FIG. 1B includes a mobile device, identified by 110*a* in a pre-motion event state and identified by 110*b* in a post-motion event state. Also shown is another mobile device 112. Although depicted as mobile phones, mobile devices 110*a/b* and 112 might also include a PDA or other device that is capable of communicating with a communications network, such as network 114, by way of a communication link 116 and 118 (variously referred to herein as "wireless connectivity"). Mobile device 110*b* is identified by number 816-555-2222 and mobile device 112 is identified by number 913-555-1111. Also in communication with network 114 is a computing device 120, which might communicate with network 114 via the Internet.

Network 114 might variously be referred to herein as a communications carrier (or just "carrier"). Illustrative carriers include Sprint Nextel Corporation; Verizon Communications Inc.; AT&T Inc.; Qwest Communications International Inc.; Deutsche Telekom AG (ADR); Cricket Communications, Inc.; Leap Wireless International; and the like. Components of network 114 such as a base station or communications tower 122 can provide wireless connectivity 116 and 118 in some embodiments. Furthermore, carrier 114 includes other components, such as a digital content usability component 124 and a wireless back-up component 126. Each of these components might include one or more servers and one or more datastores.

By way of wireless connectivity 116, mobile device 110*a/b* communicates with carrier 114. In an aspect of the technology, digital-content component 128 includes digital content 130 that might be purchased by a user of a mobile device 110*a/b* and downloaded to mobile device 110*a/b*. For example, in a pre-motion event state, mobile device 110*a* includes associated digital content 140, which is stored on mobile device 110*a* and might have been downloaded from network 114. In embodiments of the invention, associated digital content 140 also includes digital content that was requested by mobile device 110*a* and for which a download to mobile device 110*a* was initiated but might not have completed. Digital content includes various types of content such as digital literature, digital music, digital video, digital audio, digital imagery, digital multimedia, and digital TV. In an embodiment of the invention, wireless back-up component 126 includes an identification of known digital content 142 associated with mobile device 110*a*. For example, wireless back-up component 126 might include a listing of known digital content 142 associated with mobile device 110*a*. For illustrative purposes, a blown-up version of known digital content 142 of device 110*a* is shown and identified by 143. Moreover, wireless back-up component 126 might include a copy of known digital content 142 associated with mobile device 110*a*.

In aspects of the invention, mobile device 110*a/b* includes other components. For example, mobile device 110*a/b* might include a motion-detecting component 132 for detecting a motion event 134. In one embodiment, motion-detecting component 132 is an accelerometer. Motion event 134 might include any of a number of movements by mobile device 110*a/b*. For example, in embodiments of the invention, motion event 134 includes an acceleration of mobile device 110*a/b*, a deceleration of mobile device 110*a/b*, and an impact of mobile device 110*a/b* with another object or surface. FIG. 1 illustrates that in a pre-motion event state, mobile device 110*a* falls and strikes a ground surface, thereby transitioning a post-motion event state, shown by mobile device 110*b*. Motion event 134 might include a different level of severity as compared to other motion events of mobile device 110*a/b*. In one embodiment of the invention, the severity of motion event 134 is measured. For example, motion-detecting component 132 might measure a severity 143 of motion event 134. In one embodiment, a determination is made, such as by motion-detecting component 132, as to whether the a specific severity level 144 of a motion event 134 exceeds a minimum severity threshold 136.

In embodiments of the invention, motion event 134 causes all or a portion of associated digital content 140 to be rendered unusable. For example, motion event 134 might occur in the middle of a download of a portion of associated digital content 140, which results in an interruption of the download such that the downloading portion of associated digital content 140 is not usable by mobile device 110*b*. Also, motion event 134 might corrupt or otherwise render unusable by mobile device 110*b* associated digital content 140 that is stored on mobile device 110*a/b*. In post-motion event state, mobile device 110*b* includes usable digital content 146. Where digital content of associated digital content 140 has been rendered unusable, usable digital content 146 only includes a usable portion of associated digital content 140.

In aspects of the invention, upon detecting motion event 134, mobile device 110*b* communicates to network 114 an indication that mobile device 110*a/b* experienced motion event 134. For example, an indication might include a diagnosis request, which prompts network 114 to determine whether associated digital content 140 is unusable. In some embodiments, an indication is only communicated where severity 144 of motion event 134 exceeds minimum threshold 136.

In further embodiments, network 114 determines whether all or a portion of associated digital content 140 is unusable. Network 114 might be prompted to make such a determination by various triggering events. In one embodiment, network 114 determines usability of associated digital content 140 upon receipt of an indication that mobile device 110*a/b* experienced motion event 134 that exceeded minimum threshold 136. In an alternative aspect, network 114 determines usability of associated digital content 140 upon receipt of an indication that a download to mobile device 110*a* was interrupted.

Network 114 determines usability of associated digital content 140 through various procedures. In one embodiment, network 114 receives from mobile device 110*b* a list of usable digital content 146, which network 114 compares to known digital content 142. Through such a comparison, network 114 determines which portion of known digital content 142 is unusable; i.e., that portion of known digital content that is not also identified as usable digital content 146. In another embodiment, network 114 diagnostically scans mobile device 110*b* to determine which portion of known digital content 142 is unusable.

After determining that a portion of known digital content 142 is unusable, network 114 restores usability of the portion. In one embodiment, network 114 downloads to mobile device 110*b* the portion of known digital content that was determined to be unusable. Accordingly, mobile device 110*b* receives a usable version of the portion of known digital content that was determined to be unusable. In an alternative embodiment, network 114 determines that settings on mobile device 110*b* are in a modified state, which might have resulted from motion event 134, the modified state rendering a portion of known digital content 142 unusable. Accordingly, restoring usability might also include restoring a setting on mobile device 110*b*. In another example, network 114 might determine that all or a significant portion of known digital content 142 is unusable and restore usability by downloading all known digital content 142 to an alternative mobile device, such as mobile device 112.

In a further embodiment of our technology, network 114 receives an indication that a download to mobile device 110*a* was interrupted. An indication might be communicated from various sources such as mobile device 110*b*, a user of mobile device 110*a/b*, and a component that monitors download completion of digital content. In one embodiment, an indication is received at the same time as a diagnosis request. Alternatively, an indication might be received even if no diagnosis request is received. For example, if mobile device 110*b* is nonfunctional or simply does not have capabilities to communicate a diagnosis request, an indication might still be received even though no diagnosis request is communicated. Mobile device 110*b* might be non-functional due to various reasons, such as an impact in motion event 134.

After receiving an indication that a download was interrupted, network 114 communicates to mobile device 110*b* a status request. A status request might serve various purposes, such as prompting a status response from mobile device 110*b*. In one aspect, network 114 waits a period of time to receive a status response from mobile device 110*b* before taking subsequent action. A status response might include various indications of a current status of mobile device 110*b*, such as indications relating to operability, level of functionality, download success/failure, and experienced motion events.

In one aspect, if a status response is received from mobile device 110*b*, mobile device 110*b* is assessed to determine if any known digital content 142 is unusable. As previously described, usable digital content 146 might be compared to known digital content 142, diagnostic scans might be run, and mobile device settings might be checked. If all or a portion of known digital content 142 is deemed to be unusable, usability might be restored by one of the methods previously described. In addition, upon determining that all or a portion of known digital content 142 is unusable, in one aspect network 114 communicates an advisory notification to a target resource. An advisory notification might include various information, such as an indication that mobile device 110*b* might need to be serviced and an identification of known digital content 142 that was restored. A target resource might include various other devices or means of communication. For example, in one aspect target resource includes mobile device 112. In another aspect, target resource includes an email account on computing device 120. In aspects of the invention, an advisory notification is communicated by a phone call 150, a text message 152, or an email 154. Target resources might be identified in various manners. In one aspect, a user of mobile device 110*a/b* identifies and communicates to network 114 target resources.

In another aspect, if a status response is not received from mobile device 110*b* within a period of time, network 114 might communicate to mobile device 110*b* another status request, which again is directed at prompting a status response. Network 114 might continue to communicate status requests to mobile device 110*b* until a status response is received. In another aspect, a predetermined number of status requests is established, and network 114 communicates status requests until either a status response is received or the predetermined number of status requests have been communicated. In the event that a predetermined number of status requests have been communicated, and no status response has been received, network 114 might take subsequent alternative steps. For example, in one aspect, network 114 communicates to a target resource an advisory notification. In situations where mobile device 110*b* has failed to communicate a status response, an advisory notification might convey various information, such as an identification of unusable digital content, a notice that mobile device 110*b* is non-responsive, and a notice that mobile device 110*b* might need to be serviced.

Figure 2:
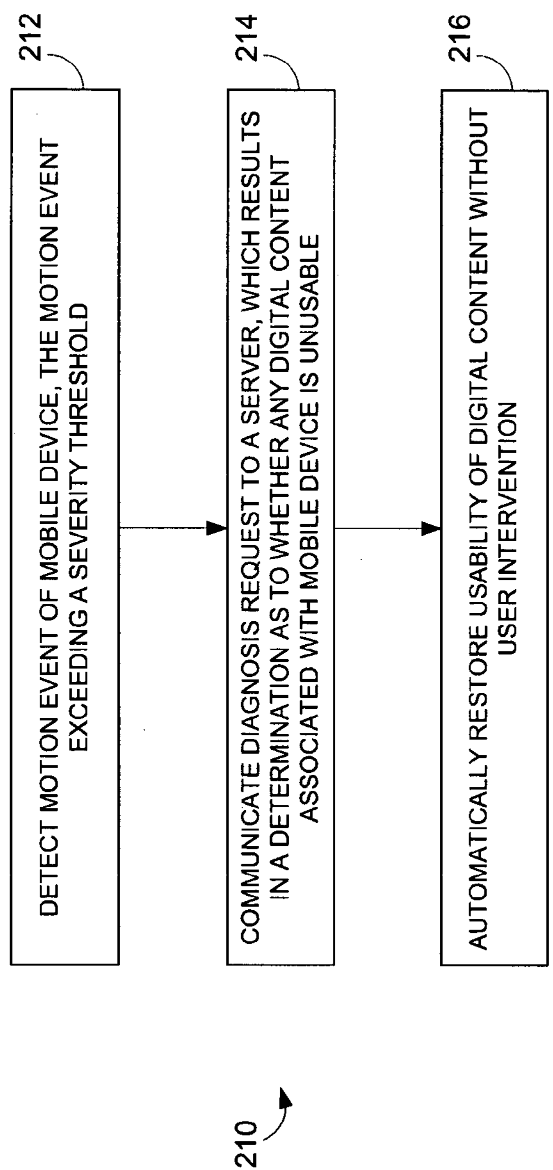
FIGS. 2 and 3 each depict illustrative methods for carrying out embodiments of the present invention.

Referring to FIG. 2, in one embodiment, the technology includes one or more computer-readable media having computer-useable instructions embodied thereon for performing a method (identified generally by numeral 210) of restoring a usability of digital content to a mobile device. The method includes at 212 detecting a motion event of the mobile device. The motion event relates to a motion experienced by the mobile device and exceeds a severity threshold. Step 214 includes communicating a diagnosis request to a server, which results in a determination as to whether any digital content associated with the mobile device is unusable. At step 216, when the server determines that digital content is unusable, usability of the digital content is automatically restored without user intervention.

Figure 3:
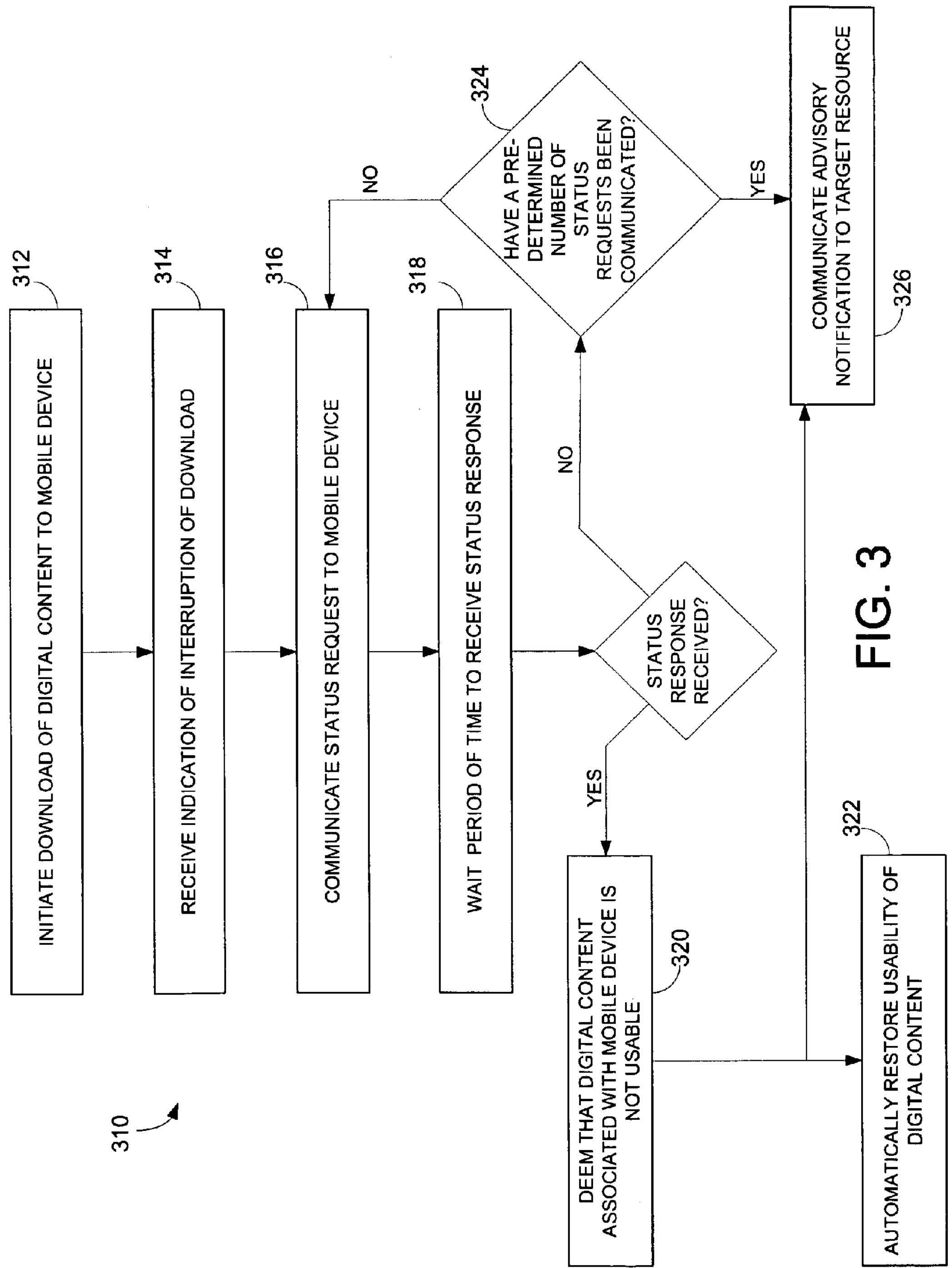

Referring to FIG. 3, in another embodiment, the technology includes one or more computer-readable media having computer-useable instructions embodied thereon for performing a method (identified generally by numeral 310) of restoring digital content associated with a mobile device. The method includes at step 312 initiating a download of requested digital content to the mobile device and at step 314 receiving an indication of an interruption of the download. At step 316 a status request is communicated to the mobile device to prompt a status response from the mobile device, and step 318 includes waiting a period of time to receive the status response from the mobile device. The method also includes at step 320, if the status response is received from the mobile device within the period of time, deeming that at least a portion of any digital content associated with said mobile device is not useable. Alternatively, if the status response is not received from the mobile device within the period of time, step 326 includes communicating an advisory notification to a target resource, wherein the advisory notification indicates that the mobile device might need to be serviced.

FIG. 3 illustrates additional steps that might also be included in a method in accordance with another embodiment of our technology. For example, in one aspect the method includes sending a predetermined number of status requests before communicating an advisory notification. As such, a determination might be made at 324 as to whether or not a pre-determined number of status requests have been communicated. If the predetermined number has not been communicated, one embodiment includes returning to step 316 and communicating a status request to the mobile device. In this situation, the method proceeds again from step 316, giving the mobile device another opportunity to communicate a status response. If the predetermined number has been communicated and no status response has been received, the method continues to step 326, which includes communicating an advisory notification to a target resource. Other embodiments illustrated in FIG. 3 include, after step 320, automatically restoring usability of digital content at step 322 and communicating an advisory notification at step 326.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of restoring digital content associated with a mobile device, the method comprising:

of transmitting by a network component a requested digital content to the mobile device to enable the mobile device to execute a download of the requested digital content;

receiving by the network component an indication that the download was interrupted, the indication being received from the mobile device;

responsive to the indication, transmitting by the network component a status request to the mobile device to prompt a status response from the mobile device;

waiting a period of time to receive the status response from the mobile device;

if the status response is received from the mobile device within the period of time, deeming by the network component that at least a portion of any digital content associated with the mobile device is not useable; and if the status response is not received from the mobile device within the period of time, transmitting by the network component an advisory notification to a target resource, wherein the advisory notification indicates that the mobile device might need to be serviced.

2. The non-transitory computer-readable media of claim 1 wherein said status response comprises an indication of one or more of operability, functionability, download success, and motion events.

3. The non-transitory computer-readable media of claim 1 further comprising: if said status response is not received from said mobile device during said period of time, prior to communicating said advisory notification, communicating one or more subsequent status requests to said mobile device and waiting said period of time to receive said status response from said mobile device, until either: (1) said status response is received, or (2) a predetermined number of status requests have been communicated.

4. The non-transitory computer-readable media of claim 1 comprising, responsive to deeming that said digital-content portion is not usable, automatically restoring usability of said digital-content portion without user intervention.

5. The non-transitory computer-readable media of claim 4 wherein said digital-content portion is restored to one or more of said mobile device and an alternative mobile device.

6. The non-transitory computer-readable media of claim 1 further comprising, responsive to deeming that said digital-content portion is not useable, communicating an advisory notification to a target resource, wherein said advisory notification indicates that said mobile device might need to be serviced.

7. The non-transitory computer-readable media of claim 1 wherein said target resource comprises one or more of an alternative phone number associated with an owner of said mobile device, an email address associated with said owner, an alternative phone number associated with an identified contact associated with said mobile device, and an email address of said identified contact.

8. The non-transitory computer-readable media of claim 1 wherein said advisory notification is communicated by one or more of a phone call, a text message, or an email.

9. One or more non-transitory computer-readable media having computer-useable instructions embodied thereon for performing a method of restoring digital content associated with a mobile device, the method comprising:

transmitting by a network component a requested digital content to said mobile device to enable the mobile device to execute a download of the requested digital content;

receiving by the network component an indication that the download was interrupted;

responsive to the indication, transmitting by the network component a status request to said mobile device to prompt a status response from said mobile device;

waiting a period of time to receive said status response from said mobile device;

if said status response is received from said mobile device within said period of time, deeming by the network component that at least a portion of the requested content that was being downloaded is any digital content associated with said mobile device is not useable; and if said status response is not received from said mobile device within said period of time, transmitting by the network component communicating one or more subsequent status requests to said mobile device until either a status response is received or a predetermined number of status requests are communicated, wherein if a predetermined number of status requests have been communicated and no status response is received, an advisory notification is communicated to a target resource and wherein said advisory notification indicates that said mobile device might need to be serviced.

* * * * *